(12) United States Patent
Holman

(10) Patent No.: US 6,327,321 B1
(45) Date of Patent: *Dec. 4, 2001

(54) BORATED ALUMINUM RODLETS FOR USE IN SPENT NUCLEAR FUEL ASSEMBLIES

(75) Inventor: Peter L. Holman, Lynchburg, VA (US)

(73) Assignee: Framatome ANP, Inc., Lynchburg, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,470

(22) Filed: Apr. 20, 1999

Related U.S. Application Data

(60) Provisional application No. 60/109,195, filed on Nov. 20, 1998.

(51) Int. Cl.[7] ............................................ G21C 7/06
(52) U.S. Cl. ..................... 376/262; 376/260; 376/261; 376/272
(58) Field of Search ................... 376/327, 272, 376/260, 261, 262

(56) References Cited

U.S. PATENT DOCUMENTS

| | | | |
|---|---|---|---|
| 4,096,392 | * | 6/1978 | Rubinstein et al. ............ 250/507 |
| 4,277,680 | * | 7/1981 | Rodriguez et al. ............ 250/358 R |
| 4,827,139 | * | 5/1989 | Wells et al. ............ 250/507.1 |
| 4,904,444 | * | 2/1990 | Kuhnel et al. ............ 376/261 |
| 4,929,412 | * | 5/1990 | Dixon et al. ............ 376/260 |
| 5,032,348 | * | 7/1991 | Blum et al. ............ 376/272 |
| 5,063,299 | * | 11/1991 | Efferding ............ 250/507.1 |
| 5,180,544 | * | 1/1993 | Yoshioka et al. ............ 376/333 |
| 5,225,151 | * | 7/1993 | Bernander et al. ............ 376/333 |
| 5,325,408 | * | 6/1994 | Hornak et al. ............ 376/260 |
| 5,377,239 | * | 12/1994 | Nopwaskey et al. ............ 376/260 |
| 5,416,813 | * | 5/1995 | Hiraiwa et al. ............ 376/419 |
| 5,425,070 | * | 6/1995 | Gosnell et al. ............ 376/260 |
| 5,479,463 | * | 12/1995 | Roberts ............ 376/339 |
| 5,719,912 | * | 2/1998 | Ledford et al. ............ 376/327 |

FOREIGN PATENT DOCUMENTS

| | | | | |
|---|---|---|---|---|
| 2483114 | * | 11/1981 | (FR) | G21C/19/06 |
| 2544541 | * | 10/1984 | (FR) | G21C/19/40 |
| 6 1175594 | * | 8/1986 | (JP) | G21C/19/06 |

* cited by examiner

Primary Examiner—Charles T. Jordan
Assistant Examiner—John Richardson
(74) Attorney, Agent, or Firm—Vytas R. Matas

(57) ABSTRACT

Extruded Borated Aluminum rodlets of extended length are formed to maximize neutron absorption surface area while minimizing weight. They are located in the empty cells of a new or spent fuel assembly previously used by control rods and instrumentation with a length equal to that of a fuel rod or guide tube and control the reactivity of the fuel assembly during storage and shipment of the spent fuel assembly.

7 Claims, 4 Drawing Sheets

BORATED ALUMINUM RODLETS FOR USE IN SPENT NUCLEAR FUEL ASSEMBLIES

This application claims benefit to Provisional Application 60/109,195 filed Nov. 20, 1998.

BACKGROUND OF THE INVENTION

1. Field of the Invention

The present invention relates generally to neutron absorbing materials used in spent nuclear fuel storage and shipping containers and particularly to such containers having homogeneous extruded borated aluminum neutron absorbing rodlets interspersed in empty cells of the spent fuel assembly.

2. Description of the Prior Art

In a nuclear reactor, the nuclear fuel is usually in the form of a plurality of individual rods assembled into a bundle of substantially square cross-section, in a manner that the rods are held in fixed, spaced relationship in a plurality of cells. Some of these cells are guide tubes containing control rods and instrumentation. One assembly design is a square bundle of cells in a 15×15 array with 17 of these cells used for control rod and instrumentation insertion.

Over a prolonged period of operation of the reactor, the fissionable fuel becomes depleted to the point where it is no longer efficient for continued use. When this state is reached, the spent fuel assembly is removed and replaced. When the spent fuel assembly is removed from the reactor the control rods and instrumentation are retracted leaving empty cells at these locations. The depleted fuel assembly is still of potential value, since the fuel rods are still reactive and can be reprocessed in a suitable facility to become capable of sustaining or fueling a nuclear reaction.

Reprocessing facilities are usually far removed from the nuclear reactor and it is necessary to ship the spent fuel over long distances, in as safe a manner as possible, for both the outside world and the fuel assembly itself. To ensure the necessary degree of safety required, the fuel assembly is loaded into a shipping cask. It is imperative that the cask assembly be so constructed that harmful radiation does not escape, that the heat generated by the radioactive decay of the spent fuel is adequately dissipated, and that the interaction between the fuel cells is such that criticality safety criteria are not violated. To achieve these ends numerous types of fuel cell shipping containers have been designed and used. The most common have been circular casks into which the fuel bundle assembly is placed. All such containers depended upon nuclear shielding located around the circumference of the cask to prevent radiation leakage during shipment or storage.

One example of such a cask is described in U.S. Pat. No. 4,827,139 wherein rectangular filler blocks or spacers are located between nuclear fuel compartments of a spent nuclear fuel shipping basket. These components are extruded from a neutron poison material such as an alloy of aluminum and Boron. It also suggests that filler blocks which define other shapes such as triangles could also be made from such material. However, there are no teachings concerning use of extruded rodlets as reactivity controllers nor of the placing of such rodlets directly into the empty assembly cells previously used for control rods and instrumentation.

Another example of such a cask is found in U.S. Pat. No. 5,373,540 wherein cruciform components are placed between spent nuclear fuel assemblies in a shipping basket that is located within the cask. The components are made from a Boron aluminum alloy. Again, there is no teaching of using rodlets as a reactivity control mechanism by placing them directly into the control rod or instrument cells rather than making the cell compartments of such reactivity control material.

U.S. Pat. No. 4,143,276 teaches yet another type of spent fuel container wherein the sides of the individual fuel assembly holders are made from reactivity control material.

It should also be mentioned that spent fuel assemblies are first stored at the reactor site pending shipment in shielded casks to recycling or storage facilities. Usually such storage is in nuclear shielded water filled or sometimes dry facilities. The entire fuel bundle assembly with empty control rod and instrumentation cells is usually stored in these facilities without any neutron absorbing material in these empty cells. Thus, an effective neutron absorbing material can be located into the empty cells of a spent fuel assembly during in-house storage as well as later shipment to a fuel reprocessing facility.

BRIEF SUMMARY OF THE INVENTION

The present invention is the use of Borated Aluminum rodlets to provide reactivity hold-down for irradiated fuel assemblies that are to be stored and/or shipped. The implementation of the invention is to fabricate an extruded rodlet of homogenous neutron absorbing material extending over the length of a spent fuel element for placement into the empty cells of a fuel assembly previously used to insert control rods and instrumentation.

Neutron absorbing material such as Borated Aluminum is easily extruded and thus can be extruded into rodlets such as cylinders of long length ideally suited for placement in the mentioned empty cells. The rodlet may also be extruded into other forms which minimize weight while maximizing neutron absorbing surface area. Such forms include cruciform rodlets, "+" shaped rodlets, and hollow tube rodlets. These mentioned forms are less expensive and lighter in weight thus requiring less structural support . There is no significant loss in neutron absorption since most of the absorption occurs on the outer surface of both the hollow as well as the solid rodlets. In the hollow tube rodlet, water is able to enter the hollow region and thermalize neutrons by collision with the water molecules. Reactivity control is thereby enhanced on the outer surface of the tubes.

Since this extruded material is very hard, no cladding is required and since it is also weldable any type of tube holder or insertion end cap is easily attached.

In view of the foregoing one aspect of the present invention is to provide a homogeneous long length neutron absorbing rodlet suitable for placement into the empty cells of a spent nuclear fuel assembly.

Another aspect of the present invention is to provide an elongated neutron absorbing rodlet optimized for low weight and neutron absorbing ability.

Yet another aspect of the present invention is to provide an extruded neutron absorbing rodlet which is hard enough not to require cladding.

Still yet another aspect of the present invention is to provide an extruded neutron absorbing rodlet which is made from a weldable material.

These and other aspects of the present invention will be more fully understood after a review of the following description of the preferred embodiment when considered with the accompanying drawings.

DETAILED DESCRIPTION OF THE PREFERRED EMBODIMENT

Figure 1:
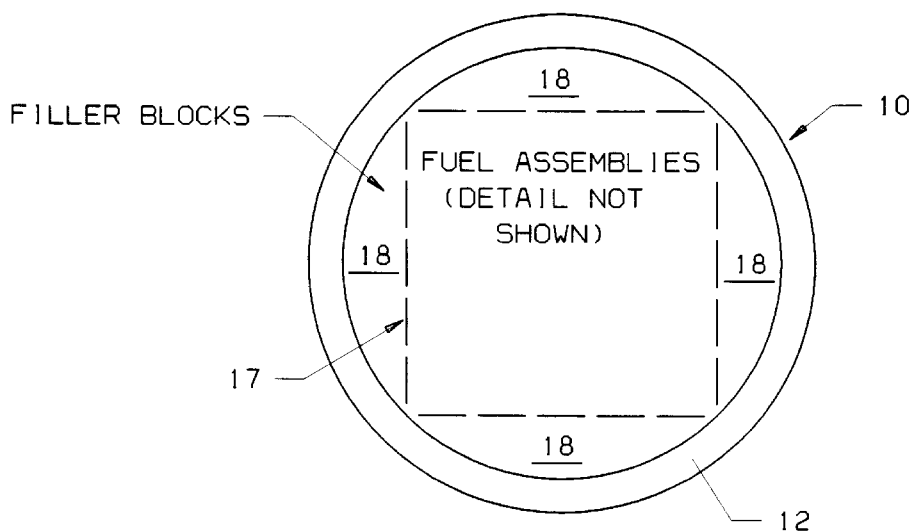
FIG. 1. is a top view schematic of a shipping cask showing the general placement of fuel assemblies FIG. 2. is a side view of a fuel assembly shipping container schematic showing placement of fuel assemblies.
Figure 2:
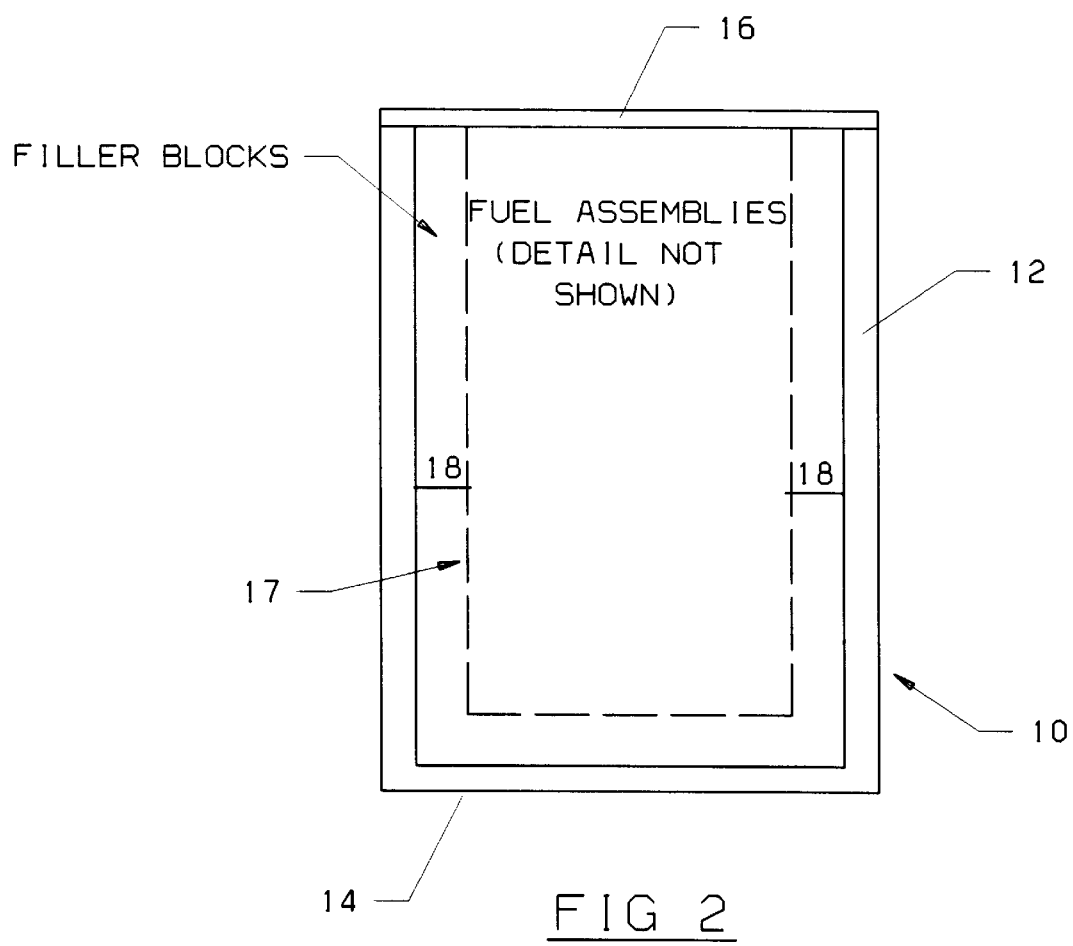

FIGS. 1. and 2 are intended to depict a typical cask design showing general placement of fuel assemblies. The application of rodlets is not limited to shipping containers but may also be used in spent fuel storage racks and in other applications. Shown in FIGS. 1 and 2 is a spent fuel transportation cask (10) including a shell (12), provided with end plates (14) and (16), that house one or more spent fuel assemblies (17). Cover plate (16) is provided for the top end of shell (12). Shell (12) is typically formed from stainless steel as is the base (14) and removable top (16).

Spaces (18) within the cask may be filled with neutron absorbing material which may be formed as the actual semi-circular section (18) by extruding same from neutron absorbing material such as Borated Aluminum and welding it to the inside surface of shell (12) since this material is weldable.

The foregoing and other application described later for rodlets proposes using the same borated aluminum material (BAL; a metal mixture of Al and $B_4C$). This material can be extruded to form rodlets of solid and hollow tubes as well as other elongated shapes such as cruciforms, + shapes and others shown in FIGS. 4–7. All are ideal for use as rodlets in fuel assembly guide and instrument tubes to control storage rack reactivity and will be described later.

BAL material is not the same as BORAL manufactured by AAR Advanced Structures. Boral which is a sandwich material of particles of boron and aluminum pressed between plates of aluminum. Boral can only be made into plates. Borated stainless-steel (BSS) rods have been manufactured, however, these rods have significant problems as follows:

(a) They can only be rolled into solid rods and are expensive to manufacture.
(b) The BSS rods are limited to a maximum of 2.5 wt % B in stainless-steel. Above that concentration material properties are such that the rods cannot be made.
(c) BSS rods are very expensive.
(d) BSS rods are heavy due to the density of steel.

Figure 3:
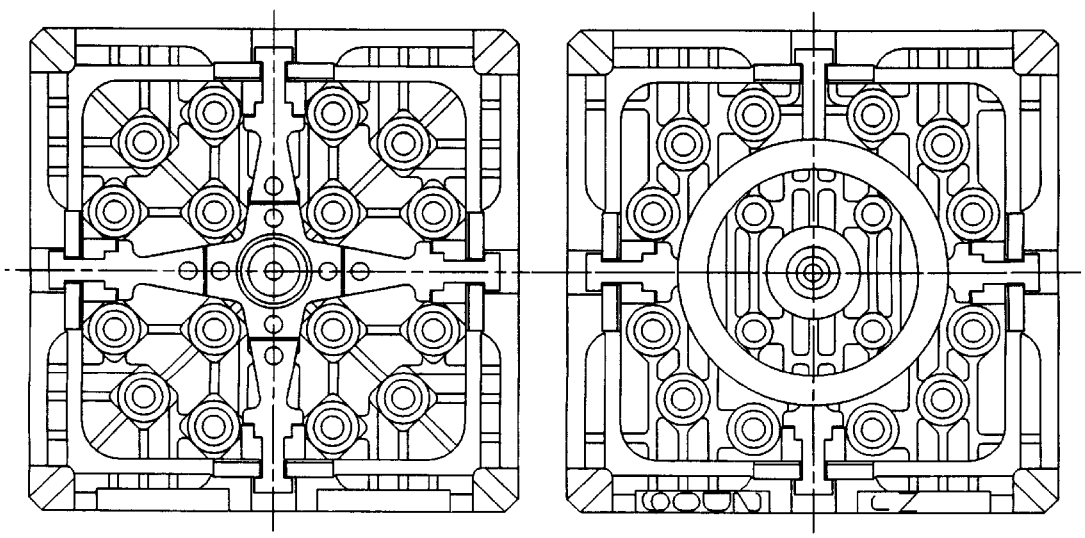
FIG. 3. is a top view of upper end fitting designs indicating guide and instrument tube locations for a 15×15 fuel assembly design.

The upper end fittings of a 15×15 fuel assembly is shown in FIG. 3. The assembly is approximately 168 inches in height having 17 cells normally used for inserting control rods and instrumentation when located in the reactor (not shown). The remaining cells contain fuel rods which are Zircaloy clad tubes filled with nuclear fuel pellets.

After nuclear fuel assemblies are irradiated in the reactor and the fuel exhausted they are first stored in a spent fuel pool in storage racks designed for that purpose. The racks must ensure that fuel remains critically safe, provides for proper heat transfer, and can accommodate design basis earthquakes or seismic anomalies. In the field of criticality, various mechanisms have been employed historically to control reactivity of the storage racks containing nuclear fuel with the isotope $B^{10}$ used as the main elemental component for neutron absorption. Borated plates have been used in regions between the storage cans designed to hold assemblies. Borated plates have been attached to the outer regions of the fuel assembly prior to insertion into the assembly can. Borated plates have been inserted in the gaps between the rods in a fuel assembly along its axial length. In one application borated stainless-steel rods have been inserted into the guide tube locations of a fuel assembly.

The present invention (see FIGS. 4–7) utilize the extrusion ability of BAL material to form various shaped rodlets for insertion into the empty cells of the spent fuel assembly to provide sufficient reactivity control for the fuel assembly. One type of a rodlet may be a solid cylindrical rod (21) or a hollow neutron absorbing tube (22) rodlet both the same length (L) as the height of the fuel cells in the spent fuel assembly. The diameter of the tube (22) or solid cylinder (21) is made to easily fit into one cell of the 15×15 spent fuel assembly (see FIG. 3). A plurality of such tubes (22) or solid cylinder (21) are then located in each of the cells that previously were used for control rods and instrumentation when the assembly was located in the reactor. The assembly and the rodlets may be safely stored in the spent fuel pool at the plant until the assemblies with either solid cylinders (21) or (22) are ready for loading into a shipping cask (10) for transport to a refueling or storage facility.

It should be mentioned that the extruded solid cylinder (21) or tube (22) is so hard that no cladding is required for the tube surfaces as is the case with the fuel pellets contained in a clad tube. Also, since this material is weldable, any type of holding and transport mechanism may be easily welded to one end of the cylinder (21) or tube (22) to aid in the insertion and removal of the rodlets into and from the empty cells of the spent fuel assembly.

Figure 5:
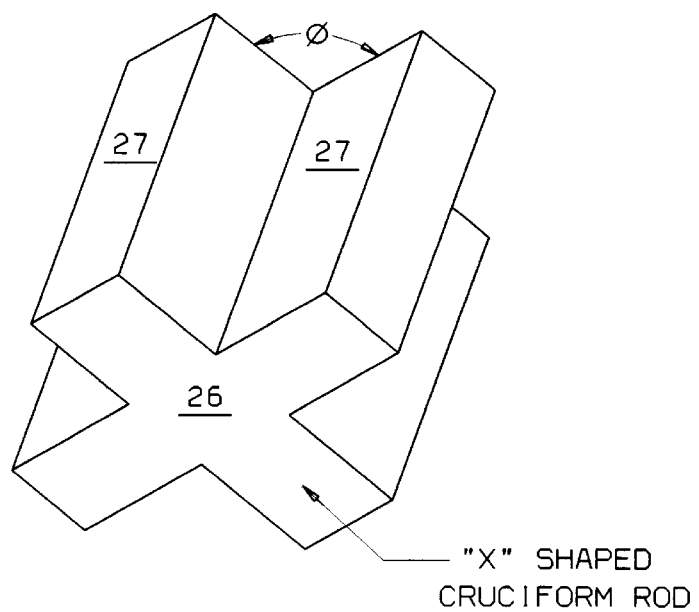
FIG. 5. is a perspective view of a cruciform shaped rodlet with angles φ<90 degrees.

Other shapes for the mentioned rodlets are also easily extruded and offer, the advantages mentioned earlier with reference to the solid and hollow rodlets. One such other shape as described by FIG. 5 is a cruciform or "X" (26) having an angle Ø less then 90° between adjoining extended members (27) and an angle less than 90° between two of the members. This design will maximize neutron absorption area with minimal weight and offers an equally effective alternative to the hollow tube (22) rodlet. Similarly a "+" shaped rodlet seen in FIG. 6 (28) having a 90° angle between adjoining members (29) could also be used. Other shapes such as an oval, square, or asterisk (*) can be manufactured.

Figure 4:
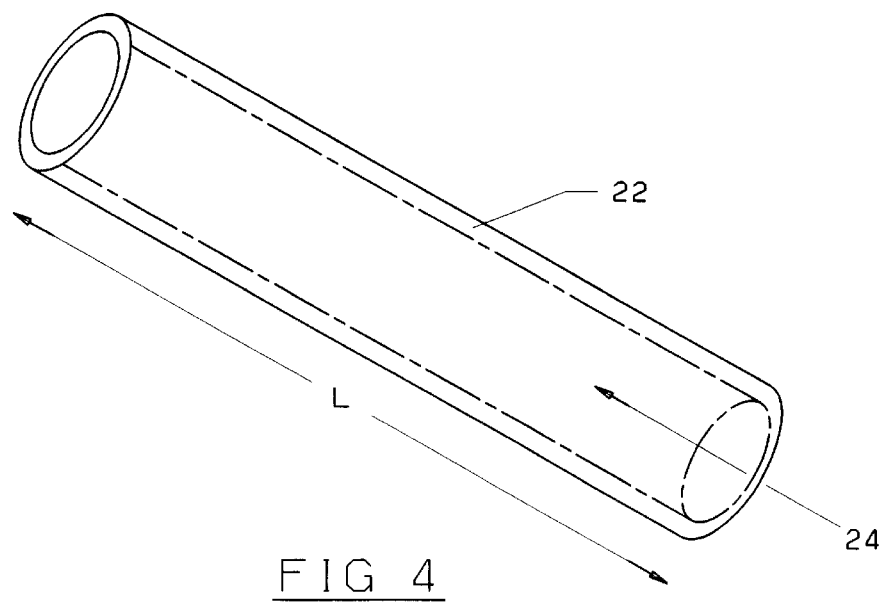
FIG. 4. is a profile view of a hollow absorber rodlet to be placed in fuel assembly guide tubes.
Figure 6:
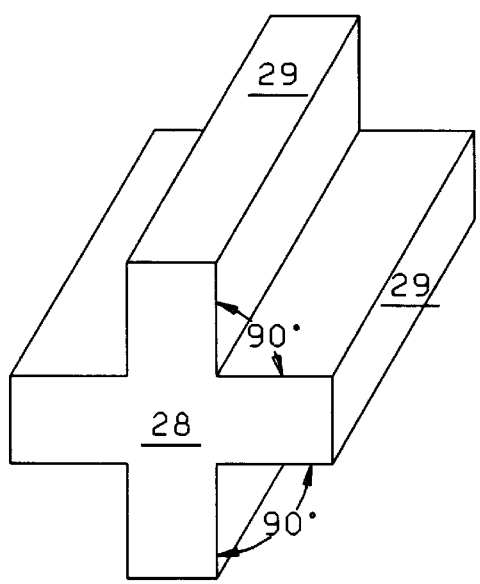
FIG. 6. is a perspective view of a cruciform shaped rodlet with angles φ=90 degrees.
Figure 7:
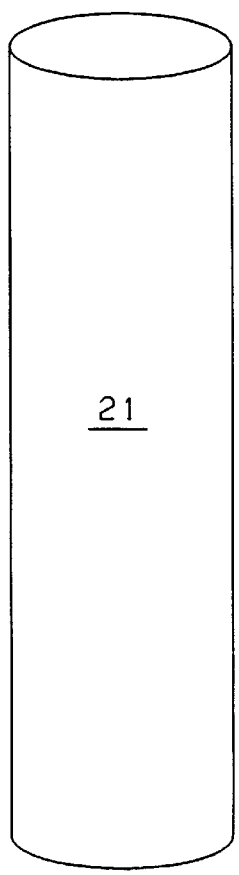
FIG. 7. is a solid absorber rodlet.

Out of the mentioned alternate rodlet shapes disclosed in FIG. 4 is the hollow tube (22) structure. This structure takes advantage of the unique phenomenon in physics that most neutrons are absorbed in the outer region of a geometrical structure that is neutron absorbing. Therefore, the inner region of a structure contributes less to reactivity control than the surface of the structure due to self-shielding of absorber atoms. Additionally, using a hollow tube allows water to occupy the inner region (24) of this geometrical shape. Neutrons that enter this region (24) slow down in energy due to collisions with the water moderator (hydrogen atoms) and do not escape through the surrounding walls of absorber (BAL) material. Therefore, the replacement of the inner rod region with water enhances the absorption ability of the outer surface region.

None of the previously described shapes can be manufactured with BSS because stainless-steel with sufficient B for reactivity control cannot be extruded. The cost of BAL is also significantly less than BSS when the inner region of the geometry is removed or the outer surface maximized for area such as in the "X" or "+" shaped rodlets. An evaluation was performed with both solid BSS and hollow BAL rods rather than a solid BSS rod. Since BAL can have up to 50 vol % $B_4C$ loading, the equivalent cost for BAL rodlets was less than BSS by approximately $150,000. Also, BAL rodlets have an advantage with regard to seismic concerns. BAL has a density of approximately 2.68 g/cc while BSS has a density of approximately 7.8 g/cc. Considering the same design, the BAL rodlet will be 2.91 times lighter than BSS. If the hollow nature or maximized outer surface of a BAL structure is considered versus the solid BSS rodlet the weight per rod may be reduced by a factor of six (6) times. Reduced nuclear storage rack weight (including all components) minimizes seismic loading responses as well as prevents violation of spent fuel pool weight limits.

To summarize, the uniqueness of using BAL rodlets of the present invention produces the following benefits:

(a) The ability to make hollow, "X" and "+" and some solid rodlet designs with BAL that is not possible with other materials and allows the rodlets to be used in the guide and instrument tubes of a fuel assembly.

(b) Hollow tube shapes utilize a water-filled center that maximizes reactivity of the outer surface.

(c) The hollow tubes or other shapes significantly reduce costs over rodlet designs using BSS.

(d) Reduces seismic impact due to reduced weight of BAL material in the hollow, "X" or shaped rod lets.

There are also general benefits associated with the use of borated aluminum material for rodlets that are as follows:

(a) The aluminum matrix can have $B_4C$ loadings as high as 50 vol %, allowing a much greater concentration of B in the matrix than is possible using borated stainless-steel (BSS). This means that the reactivity hold-down is greater with BAL rodlets than with BSS or other rodlet types.

(b) Because BAL is very hard and can be anodized no cladding is required for use in spent nuclear fuel pools. Therefore, the effective absorbing longitudinal cross-section is larger compared to material like $B_4C$—$Al_2O_3$ which are manufactured into pellets and must be loaded into a Zircalloy tube and sealed. This means that fewer BAL rodlets are required for insertion into an assembly for reactivity control than BSS or other rodlet types.

(c) The BAL rodlets can be extruded into a variety of shapes such as crosses, squares, rectangles, cylinders and tubes, etc. BSS cannot be extruded into a variety of shapes because the boron loading and hardness require BSS to be rolled. Non-cylindrical geometrical cross-sections are almost impossible to make with BSS due to the rolling manufacturing process.

(d) BAL is weldable and attachments can be readily made to the ends of the rodlets with $B_4C$ loading up to 30 vol %. It is difficult to weld BSS.

(e) BAL rodlets are very stable in water and when exposed to gamma radiation.

1. There is no leaching of boron from the aluminum matrix when exposed to water as there is with Boral (an absorber material manufactured by AAR Advanced Structures formerly known as Brooks & Perkins).

2. BAL has no hydrocarbon or silicon molecular links that degrade under irradiation such as in the case with Boraflex (a product manufactured by Westinghouse that had degraded and prompted the development of BAL rodlets).

3. The $B_4C$ material will not rumble from the edges as with Boral and there is no swelling due to gas production.

(f) BAL rodlets are more homogeneous than Boral or BSS so that the NRC 25% penalty on $B^{10}$ concentration may not be required with appropriate analysis.

(g) BAL rodlets are lightweight (2.68 g/cc for borated aluminum versus 7.8 g/cc for borated steel). The reduced weight per effective neutron absorption reduces even further the weight of spent fuel racks in storage pools.

(h) BAL rodlets are very hard and resistant to scratching. This material must often be cut by water jet techniques due to hardness.

(i) BAL rodlets may be placed in the assembly guide and instrument tubes. Other reactivity control mechanisms like Siemens "Rack Saver", a chevron shaped device, must be physically attached to the side of a fuel assembly and the assembly inserted into the fuel rack storage cell. This design is fine as long as there is no significant fuel assembly bowing and the storage cell has adequate space between the assembly edge and the cell to allow insertion of the chevron. There are no clearance problems with rodlets. They are designed to fit into the guide tubes that were intended for reactivity control purposes.

(j) The rodlet design may also be used in shipment of fuel assemblies in shipping containers (both new and irradiated) for reactivity control purposes since they fit into the guide and instrument tubes. A chevron device may need to be removed prior to fuel shipment.

(k) Because fewer rods are required for reactivity control the associated cost of BAL rodlets is potentially cheaper than other rodlet types.

Certain modifications and additions will occur to those of ordinary skill in the art upon reading the foregoing material. It will be understood that all such modifications and additions have been deleted herein for the sake of conciseness and readability but are fully intended to fall within the scope of the following claims.

I claim:

1. A method of storing spent fuel rods from a nuclear reactor for ultimate disposal or refueling comprising the steps of:

removing control rods and instrumentation from a fuel rod array assembly located in the nuclear reactor to leave empty cells therein previously holding the control rods and instrumentation;

removing said fuel rod array assembly with the fuel rods and the empty cells as part of the assembly;

inserting hollow solid homogeneous material rodlets having an inner surface and an outer surface being extruded from Borated Aluminum into empty cells previously holding control rods and instrumentation for improved reactivity on the outer surface of the said rodlets when the said inner surface is filled with water; and storing the assembly in a water filled shielded container.

2. A method as set forth in claim 1 wherein said rodlet is extruded into a hollow cylinder having an outside diameter slightly smaller than the empty guide.

3. A method of storing spent fuel rods from a nuclear reactor for ultimate disposal or refueling comprising the steps of:

removing control rods and instrumentation from a fuel rod array assembly located in the nuclear reactor to leave empty cells therein previously holding the control rods and instrumentation;

removing said fuel rod the array assembly with the fuel rods and the empty cells as part of the assembly;

inserting irregular shaped homogeneous solid material rodlets extruded from Borated Alluminum into the empty cells previously holding control rods and instrumentation; and said fuel rod array storing the assembly in a water filled shielded container.

4. A method as set forth in claim 3, wherein said rodlet is extruded into a cruciform shape slightly smaller than the cell area so as to fit therein and into a length approximately the length of said spent fuel rod.

5. A method as set forth in claim 3 wherein said rodlet is extruded into a solid cylinder having an outside diameter slightly smaller than the cell and into a length approximately the length of said spent fuel rod.

6. A method as set forth in claim 4 wherein said cruciform rodlet is formed to have an angle less than 90 degrees between cruciform extensions.

7. A method as set forth in claim 4 wherein said cruciform rodlet is formed to have an angle substantially equal to 90 degrees between cruciform extensions.

* * * * *